July 14, 1931.  C. HONEY  1,814,926
MILK BOTTLE HOLDER
Filed May 26, 1928
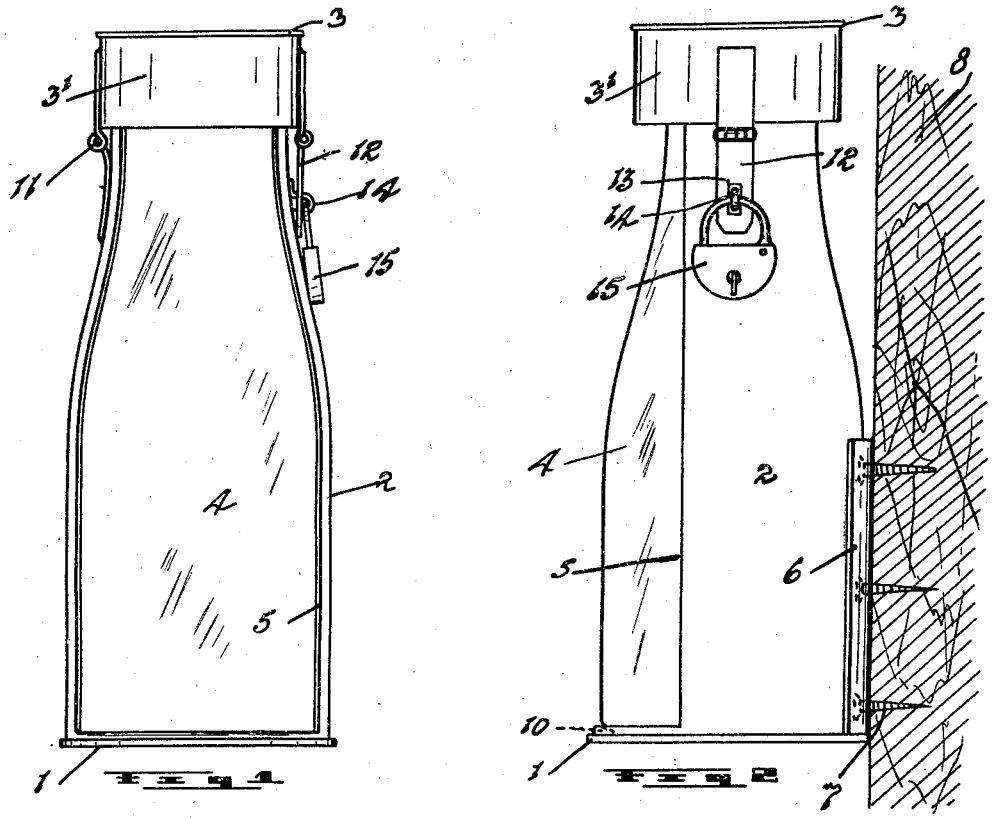
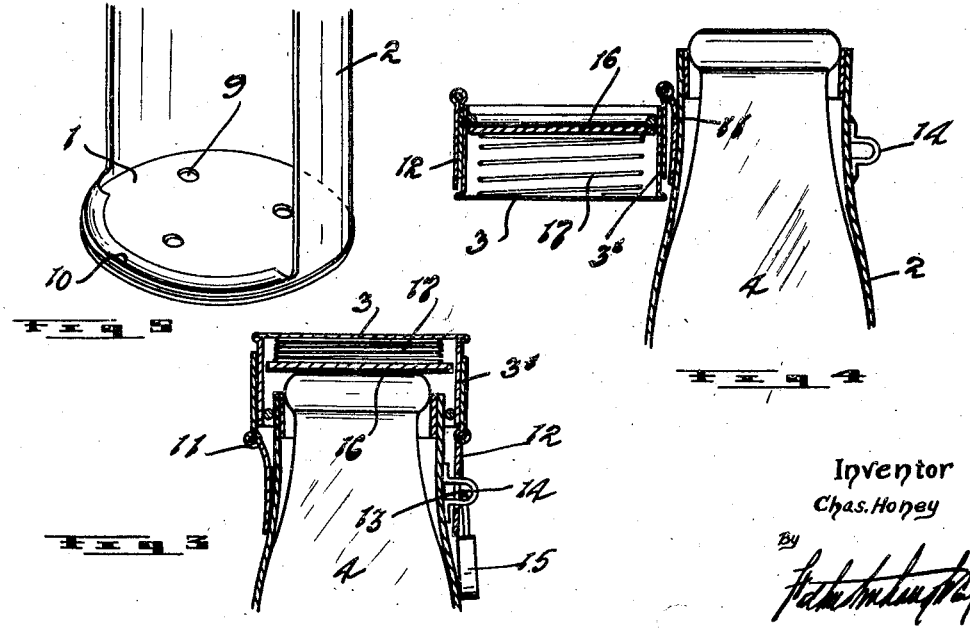
Inventor
Chas. Honey Patented July 14, 1931

1,814,926

UNITED STATES PATENT OFFICE

CHARLES HONEY, OF WINNIPEG, MANITOBA, CANADA

MILK BOTTLE HOLDER

Application filed May 26, 1928. Serial No. 280,732.

The invention relates to improvements in milk bottle holders and an object of the invention is to provide a holder into which a milk bottle can be readily inserted by say a delivery man and which after insertion becomes locked therein so that it cannot be removed by petty thieves, the device being provided, however, with a cover which can be unlocked by the proper party to permit of the removal of the bottle.

A further object is to provide a device which can be readily suspended outside a building either on a horizontal bracket or a wall and which is designed so that it can be manufactured at a comparatively small cost.

With the above more important objects in view, the invention consists essentially in the arrangement and construction of parts hereinafter more particularly described, reference being had to the accompanying drawings, in which:—

Fig. 1 is a front view of the device with a milk bottle locked therein.

Fig. 2 is a side view of the parts appearing in Figure 1.

Fig. 3 is a vertical sectional view at 3—3' Figure 2.

Fig. 4 is a view similar to Figure 3 with the cover in the open position.

Fig. 5 is a perspective view of the lower part of the holder.

In the drawings like characters of reference indicate corresponding parts in the several figures.

The holder comprises a circular base 1, a body part 2 and a hinged cover 3 which can be locked as later described.

The body part 2 is shaped to simulate the shape of the customary milk bottle 4 although it is cut away at the front to provide an entrance opening 5 for the bottle. The body part or casing 2 is somewhat greater than semi-circular in horizontal section at all the various points and the width of the opening 5 is such that one has to slightly force the bottle through the opening, the sides of the casing expanding. A reinforcing plate 6 is suitably fastened to the back of the casing and is provided with nail holes through which screw nails or such like 7 can be screwed into an adjoining wall or support 8. The base or bottom of the casing 1 is supplied with a number of holes 9 which can be used for fastening the device on a horizontal bracket and also can serve the further function of permitting rain water, dirt and so forth to escape. The front side of the base is provided with a somewhat V-shaped rib 10, the ends of which terminate at the sides of the opening 5.

The cover 3 embodies a relatively deep continuous flange 3' which receives the upper end of the casing and also the upper end of the inserted bottle. The flange is connected by a hinge 11 to the upper end of the casing 2 and diametrically opposite to the hinge, the flange carries a hasp 12 provided with a slot 13 to receive an eye 14 permanently fastened to the casing. A padlock 15 is provided to lock the hasp, the padlock passing through the eye in the well known manner. A disc shaped pressure plate 16 is contained within the cover being held to the cover by an inserted coiled spring 17, suitably attached such as by soldering to the disk and to the cover.

The device is used in the following way assuming that it is suspended from a wall or such like structure as shown. The cover is locked closed and when a party such as a milkman delivers a milk bottle, he first inserts the upper end of the bottle in the upper end of the casing and then shoves the bottle into the casing at which time, the top end of the bottle enters the cover and engages the pressure plate and compresses the spring 17. This spring acting through the pressure plate forces the bottle downwardly and as there is at this time considerably less than half the bottle exposed at the front of the holder, it is impossible for any one to withdraw the bottle as sufficient grip cannot be obtained on the exposed rounded face to pull the bottle from the holder especially against the down pressure of the spring. Here it will be observed that the V-shaped rib acts to prevent withdrawal of the base of the bottle.

When the proper party desires to remove the bottle from the holder, it is simply a matter of unlocking the padlock and swinging the cover to the open position as shown in Figure 4. The top of the bottle which at this time extends above the holder can be readily caught by the fingers and the bottle pulled ahead to remove it from the holder.

What I claim as my invention is:

1. A milk bottle holder comprising a casing having a closed bottom and an open top and provided at the front side with an entrance opening to permit of the insertion of a milk bottle into the casing, the said casing having the width of the entrance opening somewhat less than the diameter of the bottle at its various points, a cover hinged to the top of the casing, means normally locking the cover closed and a spring pressed plate contained within the casing and adapted to engage the top of the inserted bottle and press the same firmly seated on the base of the casing.

2. A milk bottle holder comprising a bottle receiving casing having a closed bottom and an open top and provided at the front side with an entrance opening for the bottle, said casing having a shape simulating that of the bottle and having the entrance opening exposing somewhat less than half of the inserted bottle, a cover hinged to the top of the casing and provided with a relatively deep marginal flange receiving the upper end of the casing, means normally locking the cover closed and a spring pressed plate carried by the cover within the flange and engageable with the upper end of the inserted bottle, said plate normally pressing the bottle downwardly and holding it tightly seated on the base of the casing.

Signed at Winnipeg this 16th day of May, 1928.

CHARLES HONEY.